United States Patent [19]
Sporre

[11] Patent Number: 5,966,657
[45] Date of Patent: Oct. 12, 1999

[54] METHOD AND SYSTEM FOR RADIO FREQUENCY MEASUREMENT AND AUTOMATIC FREQUENCY PLANNING IN A CELLULAR RADIO SYSTEM

[75] Inventor: Matts Sporre, Älta, Sweden

[73] Assignee: Telefonaktiebolaget L M Ericsson (publ), Sweden

[21] Appl. No.: 08/900,206

[22] Filed: Jul. 24, 1997

[51] Int. Cl.⁶ .............................. H04M 11/00; H04B 7/00
[52] U.S. Cl. .......................... 455/425; 455/437; 455/452
[58] Field of Search .................... 455/437, 446, 455/447, 450, 452, 455, 423, 424, 425

[56] References Cited

U.S. PATENT DOCUMENTS

| | | |
|---|---|---|
| 5,038,399 | 8/1991 | Bruckert .................................. 455/447 |
| 5,175,867 | 12/1992 | Wejke et al. . |
| 5,309,503 | 5/1994 | Bruckert et al. . |
| 5,335,356 | 8/1994 | Andersson . |
| 5,357,559 | 10/1994 | Kallin et al. . |
| 5,375,123 | 12/1994 | Andersson et al. . |
| 5,455,962 | 10/1995 | Kotzin . |
| 5,487,174 | 1/1996 | Persson . |
| 5,530,917 | 6/1996 | Andersson et al. . |
| 5,537,434 | 7/1996 | Persson et al. . |
| 5,570,412 | 10/1996 | LeBlanc . |
| 5,594,946 | 1/1997 | Menich et al. . |
| 5,594,949 | 1/1997 | Andersson ................................ 455/62 |
| 5,596,333 | 1/1997 | Bruckert . |
| 5,602,555 | 2/1997 | Searle et al. . |
| 5,613,217 | 3/1997 | Hagström et al. . |
| 5,615,409 | 3/1997 | Forssén et al. . |
| 5,752,192 | 5/1998 | Hamabe .................................. 455/452 |
| 5,828,963 | 10/1998 | Grandhi et al. ........................... 455/447 |
| 5,839,074 | 11/1998 | Plehn ......................................... 455/452 |
| 5,850,605 | 12/1998 | Souisse et al. ........................... 455/452 |

FOREIGN PATENT DOCUMENTS

| | | | |
|---|---|---|---|
| 2250665 | 6/1992 | United Kingdom ............. H04B 7/24 |
| 9707647 | 2/1997 | WIPO .............................. H04Q 7/38 |
| WO 98 37646 PCT/SE 98/01343 | 8/1998 10/1998 | WIPO . WIPO . |

OTHER PUBLICATIONS

Proceedings of ICUPU—5th International Conference on Universal Personal Communications Record, vol. 1 of 2, Sessions 1–6, IEEE Communications Society, ISBN 0–7803–3300–4, "Slow Adaptive Channel Allocation for Automatic Frequency Planning", Magnus Almgren et al., Cambridge, MA, USA, Sep. 29–Oct. 2, 1996, pp. 260264, XP002055382.

GSM System for Mobile Communications, "*The GSM System for Mobile Communications*", Michel Mouly et al., Jan. 1, 1993, pp. 420–423, XP002055504.

*Primary Examiner*—Paul Loomis
*Attorney, Agent, or Firm*—Jenkens & Gilchrist, P.C.

[57] ABSTRACT

A mobile station operating in a digital cellular system such as GSM is ordered to perform signal strength measurements on non-BCCH carrier frequencies by including an identification of those frequencies twice in the bit map comprising the BA-list. The mobile station formats a measurement report containing signal strength measurements of both BCCH and non-BCCH carrier frequencies and send it to the network which uses the data for automatic frequency allocation within the network.

34 Claims, 5 Drawing Sheets

METHOD AND SYSTEM FOR RADIO FREQUENCY MEASUREMENT AND AUTOMATIC FREQUENCY PLANNING IN A CELLULAR RADIO SYSTEM

BACKGROUND OF THE INVENTION

1. Field of the Invention

The invention relates to cellular radio systems and, more particularly, to cellular frequency planning and allocation within such systems.

2. Description of the Related Art

The explosive growth of radio telecommunications technology in recent years and its utilzation by consumers has required continual improvement in the traffic capacity of cellular systems. For example, in order to improve the spectrum efficiency of cellular systems, the industry has moved rapidly from analog modulation techniques to digital modulation techniques. This has dramatically increased the number of simultaneous calls which can be handled by a cellular system on a discreet number of radio frequency channels. Time division multiple access (TDMA) systems such as the global system for mobile (GSM) communications allows a single radio frequency channel to be time divided into a number of separate time slots with one cellular subscriber's conversation being transmitted during each of the sequentially occurring time slots. This and similar techniques have greatly expanded the capacity of cellular systems.

One important procedure which is used in the management of cellular radio telecommunications systems in order to maximize the spectral efficiency of those systems is that of frequency reuse schemes. With such frequency reuse plans, the same radio frequency channel can be used simultaneously to carry different calls in different geographically separated areas of the system, known as cells. One constraint on the reuse of the same frequency for different channels within a cellular system is that the cells in which the same frequencies are used must be physically spaced far enough apart from one another that the interference between the two competing channels (referred to as co-channel interference) is low enough to provide acceptable voice quality for the users both of the channels. The level of co-channel interference must be balanced against the system operator's desire to reuse the same limited number of radio frequency channels as much as possible within the system.

The systematic reuse of radio frequency channels within the different cells of a cellular system must be carefully organized and planned for both existing traffic capacity as well as future expansion as traffic density within the system grows over time. Classically frequency reuse planning is done by a network operator by performing traffic and coverage analysis of the geographical area of interest and by determining the expected traffic load within that area of the system. Next, data are collected which includes the number of available frequencies, anticipated system growth, grade of service desired to be rendered to the subscribers in that area as well as population and mobile subscriber station distribution anticipated within the area. With these and other data, traffic calculations are performed to determine how many cell sites and cells are needed within the geographic area under consideration. From the number of frequencies which are available, the grade of service (GOS) desired to be rendered, Erlang tables and other parameters, the amount of traffic per anticipated subscriber may be calculated. Once a cell reuse pattern is selected, the operator can then determine the number of three sector cell sites based upon frequency reuse distances.

Many different cellular frequency reuse patterns are possible, however, the three major reuse patterns are 7/21, 4/12 and 3/9. In each of these three cases, the cell site geometry includes the following features:

(a) There are three cells (sectors) at each site. The antenna pointing azimuth of the cells are separated by 120° and the cells are arranged with antennas pointing at one of the nearest site locations thus forming cells in a clover leaf fashion;

(b) Each cell uses one 60° radius transmitting antenna and two 60° diversity receiving antennas with the same pointing azimuth; and (c) Each cell approximates the shape of a hexagon.

A group of neighboring cells using all of the channels which are available in the system, but not reusing them, is referred to as a cell cluster.

As can be seen, frequency planning has classically been a relatively complex and laborious process but one which is absolutely essential in order to accommodate growth within the system and enable an operator to maximize the utilization of the frequencies which it has available and, thus, maximize its investment in the system.

A great advantage could be obtained in the operation of a cellular system if an operator was able to automatically perform frequency allocation and reuse planning within its system on a continuous, and preferably automatic, basis. Automatic frequency allocation (AFA) would be a very desirable way to simplify frequency planning while still being able to obtain system capacity close to what is possible with manual implementation of multiple reuse patterns. The general idea behind automatic frequency allocation is that of monitoring within each cell the signal strength on all frequencies, or within a subset of all frequencies, which are available to the operator. The measured signal strength on each frequency is used to estimate the interference that would be generated if that frequency was to be used within that cell. If any of the frequencies which are non-allocated within a cell has a lower interference than that of a frequency which is allocated within that cell, a frequency switch is made. The most interfered with of the then allocated frequencies is replaced by the frequency having the lowest measured signal strength. This procedure is iteratively repeated until no further improvement in co-channel interference can be obtained within the cell.

In the performance of signal strength measurement for AFA, it can be argued that it is sufficient to measure the signal strength of various frequencies on the uplink only; that is, the signal strength of the frequency as received at the base station, since this would indicate which frequencies carry the traffic. However, there are two principal reasons why it is very important to measure the signal strength of each frequency also on the downlink; that is, on the radio signals as they are received at the mobile station. First, it is important to survey the interference environment within the interior of the cell where the traffic is actually located and not just at the periphery of the cell where the base station is located. Second, the base stations of most current systems utilize sectorized antennas which implies that the uplink signal strength measurements at the base station are incapable of estimating interference originating from traffic outside the antenna sector.

With respect to the first reason, most sectorized antennas are located on the periphery of the cell which they are serving. This means that the signals received along this periphery may not be fully representative of the actual radio traffic signal conditions within the environment where most of the traffic is occurring, i.e., out in the center in the cell as well as around the periphery of the cell at some distance away from the base station. Not only will buildings and other environmental obstructions change the signal levels for various frequencies within the cell but co-channel interference by the same frequencies reused in other cells may well be different around the periphery of the cell at some distance from the base station receiving antenna than they are contiguous to that antenna.

With respect to the second reason, the sectorized antennas at the base station only receive signals within the 120° sector for which they are designed. Thus, if a particular signal is coming from outside of that sector, for example from an adjacent cell directly behind the sectorized antenna, it will measure a very low signal strength for the signal on that frequency but a mobile which is located in the middle of the cell and transmitting and receiving on an omni-directional antenna will detect a much higher signal strength on that frequency. It is this signal strength value which exists at the omni-directional antenna of the mobile station that creates co-channel interference and is thus most relevant with respect to frequency strength measurements useful in an automatic frequency allocation algorithm.

In digital cellular systems today, for example in the GSM system, downlink radio signal measurements are performed by the mobiles through a procedure known as mobile assisted hand-off (MAHO). While mobile stations which are in active mode may perform signal strength measurements on a large number of frequencies as instructed by the base station, they may only report on a small fraction of these. For example, when a GSM mobile is initially turned on and enters the idle mode it starts to find the strongest BCCH carrier of the frequencies stored in its subscriber information module (SIM) card. Once the idle mobile camps on that BCCH carrier it is periodically sent an idle mode BA-list on the system information type 2 carried on the BCCH carrier. The mobile uses this idle mode BA-list to measure the BCCH carriers among its currently serving base station and the base stations serving cells neighboring the one it is in to determine which has the strongest signal and, thus, which it should camp on for purposes of receiving or originating a call. Once the idle mobile becomes active and a call is being set up to or from it, the mobile is sent an active BA list on the slow associated control channel (SACCH) in the form of system information type 5. The frequencies on the active BA-list sent on the SACCH are those on which the mobile station should periodically measure the signal strength and send to the network in the form of a measurement report used to determine a hand-off candidate list.

The broadcast control channel (BCCH) is broadcast by the base station of the cell and includes information such as location area identity (LIA), the maximum output power allowed in the cell and the BCCH-carrier frequencies for the neighboring cells on which idle mobile stations are to perform measurements for possible cell reselection should the quality of the signal of the currently serving cell deteriorate. This list of BCCH carriers is called the idle BA-list and is sent on the BCCH in the form of a so-called, system information type 2 message. Once the mobile is active within a cell and maintaining communication on a traffic channel (TCH) it is periodically sent information on the SACCH in the form of messages from the network to the mobile stations within the cell. These messages give each mobile station updated information on the BCCH channel allocations in their neighboring cells by means of the system 5 information. These SACCH messages are broadcast to the mobiles by "stealing" time on the traffic channels. When the mobile receives the system 5 information blocks on the SACCH it may be in the form of a bit map identifying the particular BCCH channel frequencies of the neighboring cells upon which the mobile is to make signal quality measurements to be reported back to serving base station in a measurement report. Any change in the neighboring cell's description contained in the system 5 information on the SACCH is used to overwrite any old data held in the memory of the mobile station which it may have initially received on the BCCH when it entered active mode within the cell.

Once a mobile receives the, so-called, active BA-list in the system 5 information, it regularly measures the signal strength on each of the BCCH carrier frequencies of neighboring cells contained in the active BA-list. As part of this measurement, the mobile must also attempt to decode the particular base station identity code (BSIC) encoded into the signal being broadcast by each of neighboring base stations on its respective BCCH carrier. The mobile's ability to decode the BSIC information encoded into a neighboring base station's BCCH is used as one criteria of the quality of signal currently being received by the mobile from that neighboring base station.

In accordance with a standardized procedure, such as the GSM specification, once the mobile has made each of the measurements on the BCCH signals of the neighboring base stations in the active BA-list sent on the system 5 information, it then formulates a measurement report which is structured in a particular defined format. This format contains information on the six strongest BCCH carrier frequency signal measurements upon which the mobile was able to decode the BSIC. The information in the measurement report received from each mobile station is then used by its serving base station and the network to maintain a list of possible hand-off candidates for the base station in the event that the signal from a neighboring base is better than the signal quality of the signal of the mobile's currently serving base station. That is, the MAHO signal measurements made by a mobile within current cellular systems, such as the GSM system, is focused principally on measuring the signal quality of the BCCH carrier frequencies and reporting those back to the serving base station primarily for purposes of hand-off. Even though a mobile station will measure the signal strength on a TCH frequency included in the system 5 information, the mobile station will not include that measurement in the measurement report. This is because the mobile station will not decode any BSIC on a TCH carrier since no BSIC is transmitted on TCH frequencies. Although the capability exists within the mobiles for measuring the signal quality of any frequency it is instructed to measure, there is in neither the system 5 information messages a provision to tell a mobile station which frequencies in the active BA-list are TCH frequencies nor is there any facility within the measurement report format and structure for reporting to the base station the signal quality of any channels other than the BCCH channels included in the BA-list sent to the mobile.

In order to provide the ability within existing cellular system to use the mobile's measurement capabilities to measure traffic channel (TCH) signal quality and report its measurements on those traffic channels back to the base station for purposes of automatic frequency allocation, there needs to be both a structure and procedure for using such enhanced capabilities which can co-exist within the existing procedures. The method and system of the present invention provides such a capability.

BRIEF SUMMARY OF THE INVENTION

In one aspect the present invention includes a method and system for obtaining information on non-BCCH carrier frequency channels within a particular cell of a cellular radio telecommunications network operating in accordance with an air interface standard which includes a broadcast control channel (BCCH) carrying control messages from each base station to the mobile stations operating with the cell which the base station is serving and a slow associated control channel (SACCH) carrying messages in both directions between each of the mobile stations and their respective base stations while the mobile station is in active mode within the cell. A SACCH message is sent from the base station serving the particular cell to a mobile station operating in active mode within that cell and contains a list of the non-BCCH carrier frequency channels upon which measurements are to be performed by the mobile. The signal strength of each of the non-BCCH carrier frequencies specified in the SACCH message is measured at the mobile station and a measurement report is formatted containing an identification of the particular non-BCCH carrier frequency channels measured by the mobile station along with the measurement results and sent to the serving base station of that cell within a SACCH message. In one embodiment of the invention, the particular non-BCCH carrier frequencies on which signal strength measurements are to be made are identified to the mobile station by being included twice in the list of carrier frequency channels sent on the SACCH to be measured by the mobile.

In another embodiment of the invention, the measurement report sent by the mobile station to the base station is of a standard length containing a fixed number of octets of data and includes a first data field containing indicia which indicate the number of BCCH-carriers on which measurement reports are included and thereby indicates that the remaining octets of that report contain the channel designations and signal strength measurements of the non-BCCH carriers measured by the mobile station.

In another aspect the present invention includes a data format for a frequency channel measurement report to be sent from a mobile station operating within a cell of a cellular system to the base station currently serving that mobile station within that cell wherein the measurement report body includes a fixed number of octets of data and may contain measurement reports on one or more broadcast control channel (BCCH) frequencies of other cells which neighbor the serving cell. The data format of the report includes an overhead section within which information related to the mobile station sending the report and the cell within which it is operating is included. A first identification section of the report contains a multi-bit code which identifies the number of BCCH frequency channels upon which measurements are being reported in the reports and a BCCH-channel measurement section contains the measurement reports on the identified number of BCCH frequency channels along with their associated channel designations. A second identification section of the report contains an indication that additional information is to follow in the remaining octets of the report while a non-BCCH channel measurement section contains additional information to be sent from the mobile station to its serving base station and fill substantially all of the remaining octets in the report format. In one embodiment of the format the non-BCCH channel measurement section contains measurement reports on traffic channels (TCH) measured within the cell by the mobile station along with their associated channel designations.

In yet another aspect, the present invention includes a method and system for performing automatic frequency allocation within a cellular radio telecommunications system. The signal strength of a plurality of carrier frequencies within a plurality of the cells of the system is measured on the uplink at the base station. At least one mobile station within each of the plurality of cells measures the signal strength on a plurality of carrier frequencies on the downlink. The measured signal strengths of the carrier frequencies measured at the mobile stations is sent to each of their respective serving base stations in the form of a measurement report. A composite signal strength value is assembled within the network for each of the carriers which is currently allocated within a selected one of the plurality of cells by the system frequency plan and a composite signal strength value is assembled within the network for each of the carriers which is not allocated within the same selected one of the plurality of cells by the system frequency plan. The system determines whether any non-allocated frequencies within the cell are less interfered with any allocated frequencies in said cell and modifies the system frequency plan by replacing the most interfered with frequency in said cell with a less interfered with frequency to improve the quality of service within the cell.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

Figure 1:
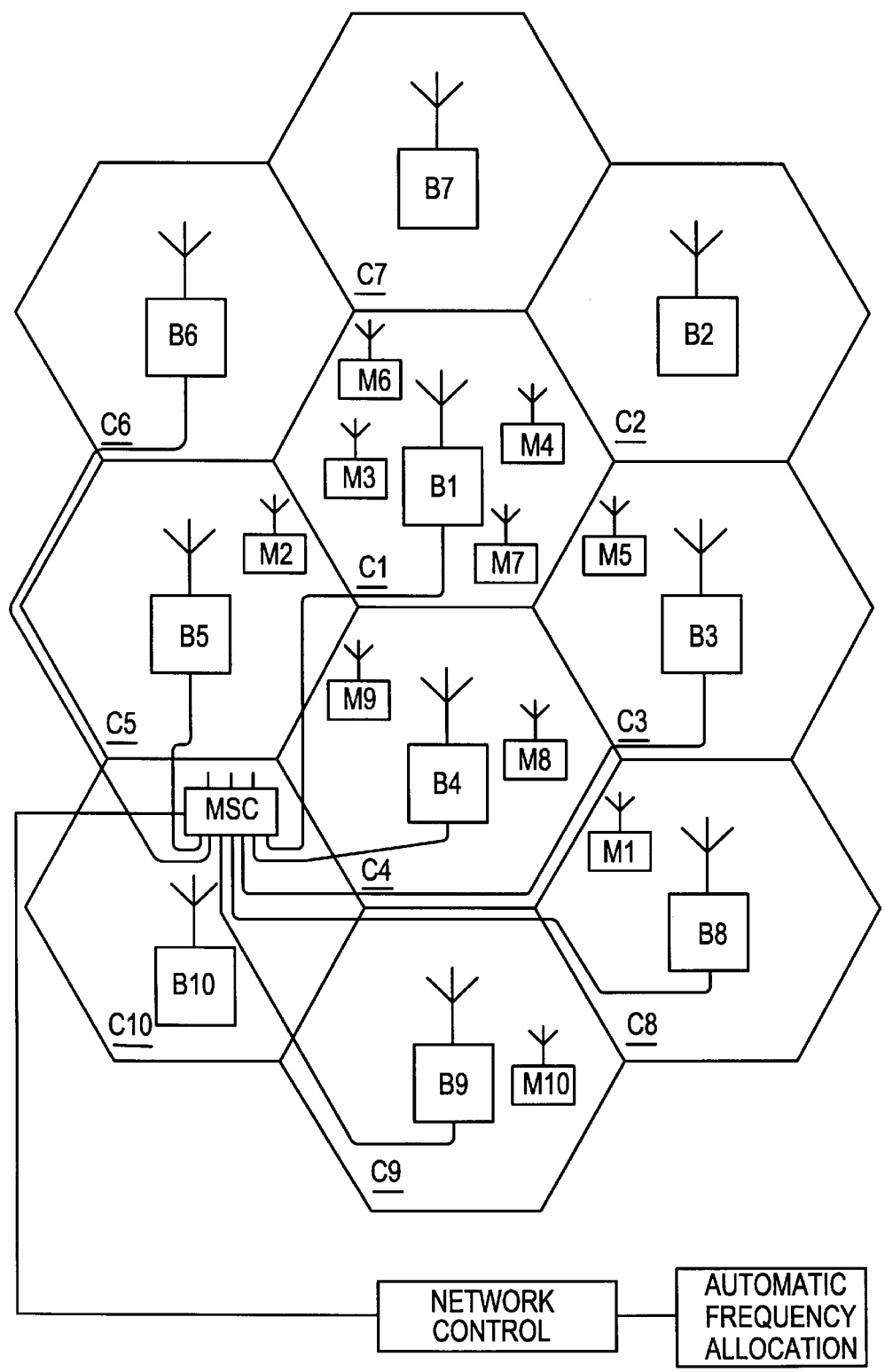
FIG. 1 is a diagrammatic depiction of a cellular radio system including a plurality of cells, base stations and mobile stations.

To provide a context within which the details of the present invention may be set forth, the general construction and operation of a cellular mobile radio system will first be described. FIG. 1 is a diagrammatic representation of such a system which contains ten cells, C1–C10. Of course, a cellular radio system would contain many more cells than ten but for purposes of this illustration the system shown in FIG. 1 may be considered to be an isolated portion of a larger system, only ten cells of which are shown.

Within each of the cells C1–C10, there is a corresponding respective base station B1–B10 serving that cell. In the exemplary embodiment of FIG. 1, the base stations B1–B10 are shown as having omni-directional antennas and being located in the vicinity of the centers of the cells, however, a person skilled in this art will recognize that base stations may typically be located in other areas of the cells, for example, at the intersection of three adjacent cells and have sectorized antennas so that three base stations serving three different cells may be positioned at the site.

Also shown within FIG. 1 are a plurality of mobile stations, M1–M10 which are subject to movement within each cell and from one cell to another cell. Of course, a typical cellular system would have many more mobile stations operating within it than ten. A mobile switching center, MSC, is connected to each of the base stations B1–B10 by means such as cable or microwave and to a fixed public switched telecommunication network (PSTN).

Each cellular radio telecommunication system is assigned a particular frequency band within which it must operate. This frequency band is subdivided into units called channels, groupings of which are allocated to the cells located in a particular area. Because of the limited radio frequency spectrum which is available to each operator, it is important to efficiently use these frequencies in order to maximize the traffic capacity and economic return of the cellular system. As discussed above, many different frequency reuse plans have been implemented in order to try and more efficiently allocate radio channels within the available spectrum to different cells. Certain of these channel allocation methodologies assign fixed sets of channels to each cell, while others allocate channels dynamically based upon traffic densities and/or interference situations. The present invention relates to a method and system for regular and systematic dynamic channel allocation within cells in order to automatically realign the frequency allocation plan of the system to maximize channel utilization while minimizing co-channel interference within the system.

Figure 2:
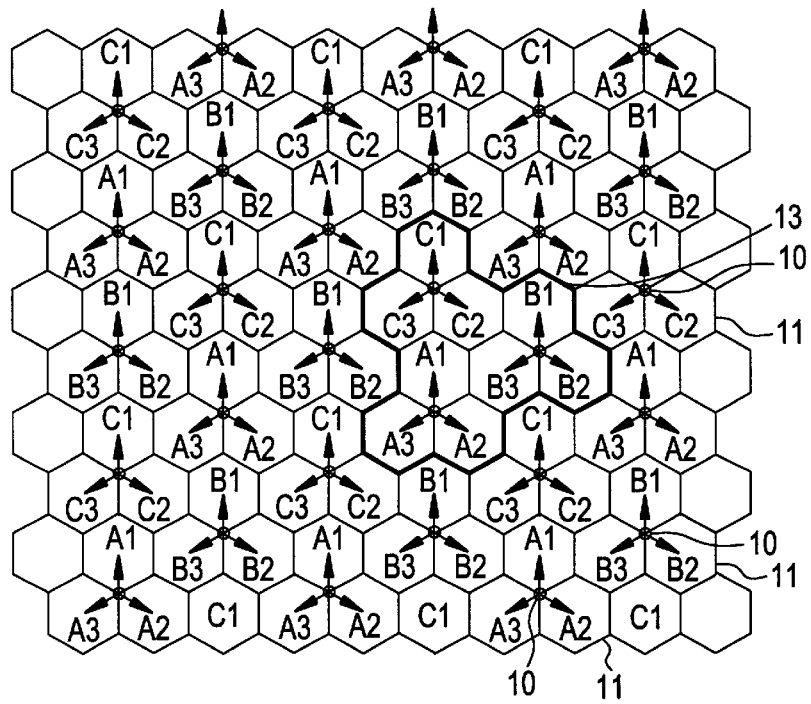
FIG. 2 is a diagram depicting a 3/9 frequency reuse cell pattern of a cellular system being served by base stations with three sector antennas.

FIG. 2 illustrates an exemplary 3/9 frequency reuse plan within a cellular system implemented with each base station 10 containing three sectorized antennas and being located at the intersection of three adjacent cells 11. In this 3/9 frequency reuse plan, 9 sets of frequency groups A1–A3, B1–B3 and C1–C3 are reused in a systematic fashion throughout the cells. Assuming a representative number of 24 frequencies (or channels) are available for reuse, an exemplary division of these available 24 frequencies into frequency groups is shown in Table I.

TABLE I

| Freq. Groups | A1 | B1 | C1 | A2 | B2 | C2 | A3 | B3 | C3 |
|---|---|---|---|---|---|---|---|---|---|
| Channels | 1 | 2 | 3 | 4 | 5 | 6 | 7 | 8 | 9 |
| | 10 | 11 | 12 | 13 | 14 | 15 | 16 | 17 | 18 |
| | 19 | 20 | 21 | 22 | 23 | 24 | | | |

Those who are skilled in the art of frequency planning for cellular systems, would recognize that frequency reuse clusters such as the exemplary cell cluster 13 in FIG. 2, of many different types such as 3-cell, 4-cell, 9-cell, 12-cell and 21-cell arrangements are well known and that the system of the present invention can be implemented using any of these types of frequency reuse patterns.

In existing cellular systems such as that illustrated in FIG. 1, when a new connection is established to a mobile station by a base station, the base station orders that mobile station to make periodic signal quality measurements on the downlink BCCH channels of the base stations serving the cells which are neighbors to the one in which the mobile is located. These measurements are regularly made and reported back to the base station and network which uses it to construct a list of neighboring cells which are candidates for possible hand-off of the mobile in the event its radio connection to its serving base station deteriorates and its signal quality becomes unacceptable. Once a mobile station is handed over to a neighboring cell it receives a new list of neighboring cell BCCH-carrier frequencies on which it regularly and systematically measures the signal quality. These signal quality measurements are used to formulate a new hand-off cell candidate list and to estimate the quality of signal the mobile might receive on the traffic channels within those cells.

While some relevant information is contained within the signal strengths of the BCCH carriers of neighboring cells measured by the mobile, these measurements are insufficient to provide a truly thorough and accurate indication of the signal quality on the various traffic channels in use within the cell. As can be seen in FIG. 2, each of the base stations in the exemplary 3/9 cellular reuse plan utilizes a sectorized antenna covering approximately 120° and is located on the periphery of the cell which it is serving and into which it is broadcasting. The traffic channel signal quality measurements made at the base station very likely do not represent the quality of the same signal being received by a mobile on the same channel since the mobile may be located someplace in the middle of the cell or, perhaps, even located on the periphery of the cell opposite the location of the base station. It is very important to survey the co-channel interference environment on each traffic channel at the physical location where the traffic is; that is, in the interior of the cell as well as around its entire periphery, and not just at the base station.

The base stations 10 shown in the 3/9 frequency reuse plan of FIG. 2, each utilize three sectorized antennae of 120° each serving respectively the three cells 11 at the intersections of which the base station is located. The cells are organized into frequency reuse sectors 13. Thus, when a base station 10 measures traffic channel frequency signal quality with its antenna directed into the cell which that antenna is serving, and measures the signal quality of a plurality of different traffic channels within that cell, it will only efficiently hear those signals coming from sources within the 120° azimuth of its antenna. Signals which are on the same traffic channel frequency but which are coming from outside of that azimuth, for example, from directly behind the antenna, will be received and perceived as a very low signal value. However, a mobile station located within the interior of that cell and operating within an omni-directional antenna may be seriously interfered with by the same signal which appears to the sectorized base station antenna as being very small. Thus, it is very important in gathering information on traffic channel signal quality for purposes of automatic frequency allocation among the cells of a cellular system that measurements be made not only on the uplink by the base station but also on the downlink by the mobile stations.

As discussed above, downlink measurements are routinely performed by mobile stations in accordance with their MAHO procedures but only to obtain signal strength measurements on a prescribed set of frequencies contained with the BA-list of neighboring cell BCCH frequencies. Additionally, in current systems, the mobile station can only report on a fraction of the measured BCCH channels, i.e. the six strongest BCCH-carriers upon which the mobile performing the measurements could decode the BSIC of those neighboring base stations.

In the measurement reports sent by the mobile station to the base station during its active mode only the signal strength measurements for, at maximum, the six strongest BCCH frequencies contained in the active BA-list will be reported and only if the measuring mobile manages to decode the BSIC on these frequencies. The only frequencies that transmit a BSIC are the BCCH carriers. As discussed above, the mobile station periodically obtains an updated active BA-list from the network by listening to the system 5 information regularly broadcast on the SACCH channel.

A principal problem associated with using the existing mobile cellular network procedures for TCH signal quality measurements is that each mobile only reports on the six strongest carriers contained in the BA-list and only those on which the mobile is able to decode the BSIC. There is no way under current standardized procedures within the GSM system specifications, or any others currently known to be in use, to survey the BCCH frequencies not among the six strongest. Moreover, signal strength on the TCH carriers are never reported by a mobile station on the downlink regardless of their absolute signal strength value since no BSIC is transmitted on TCH carriers. In addition, if there is a need for the network to obtain other types of information from the mobiles there is no defined message that can be used by the mobile to send this information back to the network.

The purpose of the current standardized measurement reports sent by mobile stations to a base station is strictly to aid the network in making decisions regarding handover of the mobile station from one cell to another and thus the frequencies which are contained in the active BA-list are only those of the BCCH carriers. The measurement report is structured so that the desired response from the mobile making the measurements is the signal strength of the strongest BCCH frequencies. If the network would like to obtain some other type of information associated with a frequency within the system, there is no way for it to request that information from the mobile, no way to tell the mobile which frequencies to survey and there is no way for the mobile to format and return that requested information to the base station.

The method and system of the present invention provides a technique by which the network can designate to a mobile station additional frequency related data it would like it to gather by measurement within the system for purposes other than handover channel ranking. It also includes a way for the mobile to communicate its measured frequency related findings back to the base station. For example, traffic channel signal strength information which is directly related to the quality of the various frequency channels in use within the cell can then be used by the network to automatically allocate and reallocate channels among the cells to modify the frequency reuse plan for maximum efficiency with minimum co-channel interference to the mobiles within the cells. The capabilities of the present invention can also be used by the system for other purposes. For example, to request and obtain other frequency related information from a mobile for other purposes and without disrupting the currently well established BCCH-carrier frequency measurements necessary to perform hand-offs in a timely and efficient fashion.

As pointed above, each mobile is sent a list of neighboring cell frequency channels when it initially becomes active within a cell by means of system 5 information on the SACCH. It then begins an established procedure of measuring the signal quality on each of these neighboring cell BCCH channels and reports them back to its serving base station so that the network will have a continuous record of the best possible control channel frequencies available to the mobile for purposes of possible hand-off in the event its current signal deteriorates. This list of neighboring channel BCCH frequencies is stored in the memory of the mobile. The mobile may be sent updated system information on the slow associated control channel (SACCH) when necessary by insertion of that information into the traffic channel upon which the mobile is connected. Several types of information are sent back and forth between the mobile and its serving base station on the SACCH.

Figure 3A:
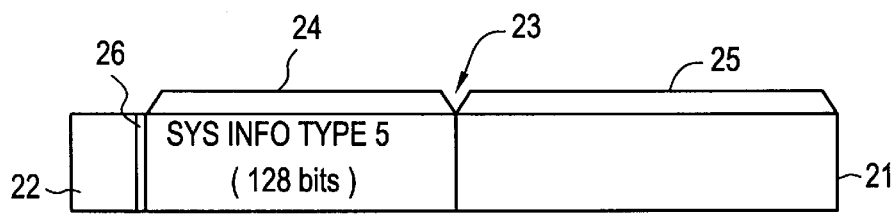
FIGS. 3a–3c are diagrammatic depictions of the message blocks in a system information type 5 message on a SACCH channel for system 5, system $5_{bis}$ and system $5_{ter}$.
Figure 3B:
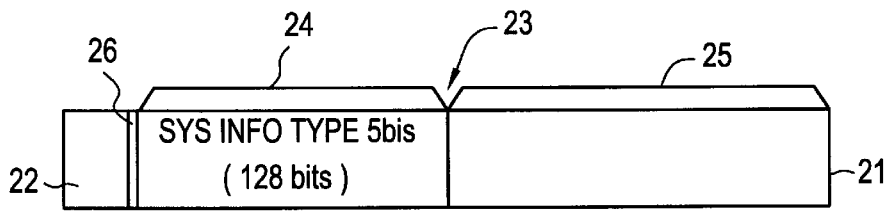
Figure 3C:
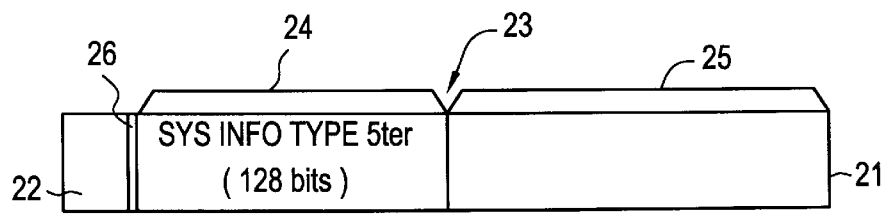

Referring next to FIG. 3a, there is shown an illustrative diagram of a SACCH message block 21. The SACCH block includes an L1 header 22 as well as a message portion which may include, for example, on the downlink, system information from the base station to the mobile and, on the uplink, the measurement report sent by the mobile to the base station. In the illustrative block shown in FIG. 3a, the contents of the message portion 23 is illustratively deemed to be a downlink message on the SACCH which includes a block 24 containing system 5 information and a block 25 containing other information being sent from the base station to the mobile. The system 5 information 24 illustratively includes a bit position 26 indicating to the mobile that additional system 5 information is to follow this information in the form of a system $5_{bis}$ block message in a subsequent SACCH block. The system 5 message itself in the field 24 may illustratively take the form of a field 128 bits in length comprising a bit map identifying those particular BCCH channel frequencies comprising the BA-list of neighboring cell control channel frequencies which the mobile station is to measure and report back to the base station. In the event that the system information type 5 information field of 128 bits is insufficient to carry all the information desired to be sent between the base station and the mobile, the GSM standard specification provides for two extensions of additional system 5 fields. In the event additional information in these supplemental fields are to follow a system 5 information transmission, there is placed in a bit position 26 of the system 5 information block 24 a bit indicating that an additional field follows. As shown in FIG. 3b, the second field known as system information type $5_{bis}$, also consist of a 128 position bit map available to identify additional frequency channels upon which measurement is to be made by the mobile station. Similarly, the system $5_{bis}$ field 24 FIG. 3b contains a control bit position 26 which if it contains a certain signal, indicates that a third supplemental system 5 information block is to follow. Illustrated in FIG. 3c is such a supplemental system information type $5_{ter}$ block similarly consisting of a 128 bits. Thus, using the exemplary communication format bit maps shown in FIG. 3a–3c, it can be seen that up to 388 different frequency channels can be indicated via a bit map configuration upon which the mobile station is to perform signal quality measurements.

Existing mobile stations are preprogrammed in accordance with the standard to interpret any frequency channels identified in the BA-list sent within the system 5 information on the SACCH as a BCCH channel upon which it is to make signal quality measurements and attempt to decode the BSIC signal identifying that particular base station. It is also programmed to thereafter only report the six largest signal quality measurements of BCCH channels from which it was able to successfully decode the BSIC. Thus, there needs to be a mechanism by which the mobile can be informed that a frequency channel designation sent to it over the system 5 information is not a BCCH channel but rather, for example, a selected traffic channel (TCH) upon which the system desires signal quality measurements for purposes such as of performing automatic frequency allocations for frequency planning within the system. The system of the present invention so designates such traffic channels to be measured by sending a bit map representation of that channel twice in the system 5, system 5$_{bis}$ and system 5$_{ter}$ sequence of information forming the BA-list sent to the mobile via SACCH. This technique of designation allows a mobile station to be programmed to respond by making the appropriate measurements on those channels and being able to subsequently return the information to the base station even though there was no BSIC associated with that channel to be decoded.

The measurements made by the mobile station on the frequency channels of neighboring cells takes place during time periods when the mobile is not doing anything else; that is, between transmission and reception by the mobile on allocated time slots. The signal strength of the serving cell is monitored during the reception of the time slot allocated to the mobile. On the SACCH, the mobile is informed via the system 5 information as to which neighboring BCCH carriers are to be monitored for hand-off purposes and the signal strength of these carriers are measured one by one by the mobile. The working schedule for the mobile includes the sequential occurrence of transmit-measure-receive-transmit-measure-receive, and so forth. The mobile calculates a mean value of several measurements for each carrier signal which is then reported to the serving base station in the measurement report.

Figure 4:
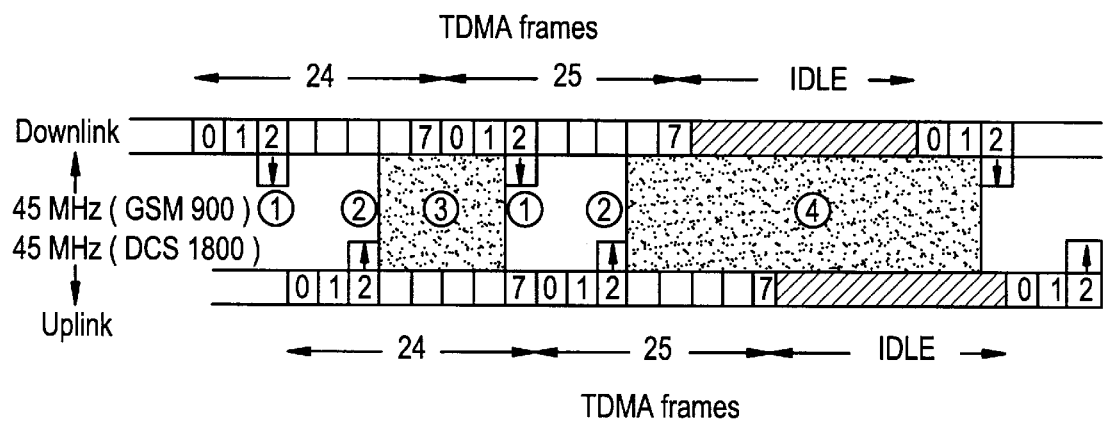
FIG. 4 is a diagram illustrating the basic principles of radio channel signal strength measurement performed by a mobile station operating in accordance with the GSM system specifications.

The sequence of operation of the mobile station illustrating its procedure in making signal strength measurements is diagrammatically illustrated in FIG. 4. The illustrated sequence is performed in accordance with the GSM system specifications and on the downlink the mobile first receives at 1 and measures the signal strength on the serving cell during time slot (TS) 2 of frame 24. Next on the uplink, the mobile transmits during TS 2 of frame 24 at 2. At 3, the mobile station enters a time period during which it measures the signal strength of at least one of the neighboring cells which it was commanded to measure via the system 5 information sent to it on the SACCH. Finally, the mobile station reads the BSIC on time slot 0 for one of the neighboring cells. As discussed above, the mobile station will report the six highest mean signal strength values of the neighboring cells for which valid BSICs were decoded. Since the mobile station may not be synchronized with the neighboring cell for which it is trying to determine its identity by decoding the BSIC, the mobile station does not know when time slot 0 on that BCCH carrier will occur. Therefore, it has to measure over a time period of at least eight time slots to be sure that time slot 0 will occur during the measurement. This is accomplished with an idle frame as illustrated in step 4 of FIG. 4. By repeatedly stepping through the sequences illustrated in FIG. 4, the mobile systematically measures the signal quality on each of the frequency channels it has been ordered by the base station to measure via the system 5 information sent on the SACCH.

In accordance with one aspect of the present invention, a mobile station receives information as to which frequency channels are to be considered for hand-off purposes on the BA-list sent on the system 5 information via the SACCH. During an eight slot cycle the mobile station measures the signal strength on the frequencies contained in the BA-list during four of those slots. In addition, the mobile attempts to decode a basic BSIC value on each of those BCCH frequency channels. Of the frequencies identified in the BA-list for which the mobile managed to decode BSIC, the six channels with the strongest signal strength are reported to the network in the measurement report sent from the mobile station to the base station via the measurement report. However, it should be noted that it is not certain that BSIC can be decoded on as many as six of the BCCH carrier frequencies upon which the mobile is ordered to measure and report. This results in a measurement report which contains information on fewer than six BCCH frequencies. In accordance with the principles of the present invention, the remaining octets of space within the standardized measurement report are filled with other data such as the measured signal strength on a selected number of traffic channel (TCH) carriers. Moreover, rather than relying on a mobile's failure to be able to decode BSIC on fewer than BCCH carriers to provide empty space within the standardized measurement report, in another aspect the present invention contemplates instructing the mobile to intentionally report results on fewer than six BCCH carrier signals and instead fill the remainder of the measurement report with other information useful to the network for various purposes, such as TCH signal measurements for automatic frequency allocation.

Pursuant to the specifications of the GSM standard, the standardized measurement report is limited to 17 octets, including overhead data. Thus, it may not be possible for the mobile station to send information on all the frequencies of interest in a single report. In addition, the mobile station must be informed as to which frequencies it is to survey and report back to the base station. As mentioned above, in one aspect of the present invention this is accomplished by having the designation of frequencies, other than BCCH carrier frequencies of neighboring cells which are to be measured and the BSIC decodes as in the present practice, occur twice in the BA-list sent to the mobile station via the system information 5, 5$_{bis}$ and 5$_{ter}$ information blocks in SACCH.

One additional aspect of the present invention addresses how to indicate to the network that there is more information in the measurement report than is usually expected. A measurement report formatted in accordance with the present invention solves this problem by starting the remaining octets of the measurement report following the overhead with a code indicating to the network what additional information follows. This 3 bit code is used to inform the network about the type of information which is to follow, for example, that the information contained is the signal strength on a specified number of BCCH frequencies indicated in the 3 bit code.

As pointed out above, the network informs the mobile stations as to the frequencies on which it is to measure signal strength on the downlink by including those frequencies twice in the system 5 information messages on the SACCH. Due to special coding techniques used in the mapping of the system 5 information onto SACCH, it is not possible to include a signal frequency channel designation twice in only one part of the system 5 information. Thus, the system 5 information message must be continued in the form of system 5$_{bis}$ and system 5$_{ter}$ messages. In this way, the network includes the indicated frequencies upon which the mobile station is to measure first in the system 5 information block and then again in either the system 5$_{bis}$ information or system 5$_{ter}$ information blocks.

Once the mobile station knows the frequencies upon which it is to report signal strength measurements even though no BSIC can be decoded on those signals, it can report its findings to the base station in several different ways. For example, the mobile station may include measurement reports on only the four or five strongest BCCH frequency channels with decodable BSICs and use the remaining octets of the measurement report to communicate the measured signal strength on other specially indicated frequencies, for example, on traffic channels (TCH) of interest to the network. This process is repeated through a sequence of measurement reports from the mobile station until the signal strengths of all frequency channels of interest have been reported by the mobile station to the network. In another alternative report format, the mobile station can send a measurement report which contains no BCCH carrier measurements at all. Rather, it can use one of a sequence of measurement reports, for example every tenth report, to send to the base station the measured signal strengths on only the frequencies which are doubly included in the BA-list in the system 5 information. The other reports in the sequence is to be used in the conventional fashion to report BCCH carriers upon which BSIC has been decoded. The mobile includes such a pre-programmed procedure by which a sequence of reports are issued. This procedure can be initiated by a message from the base station.

Figure 5:
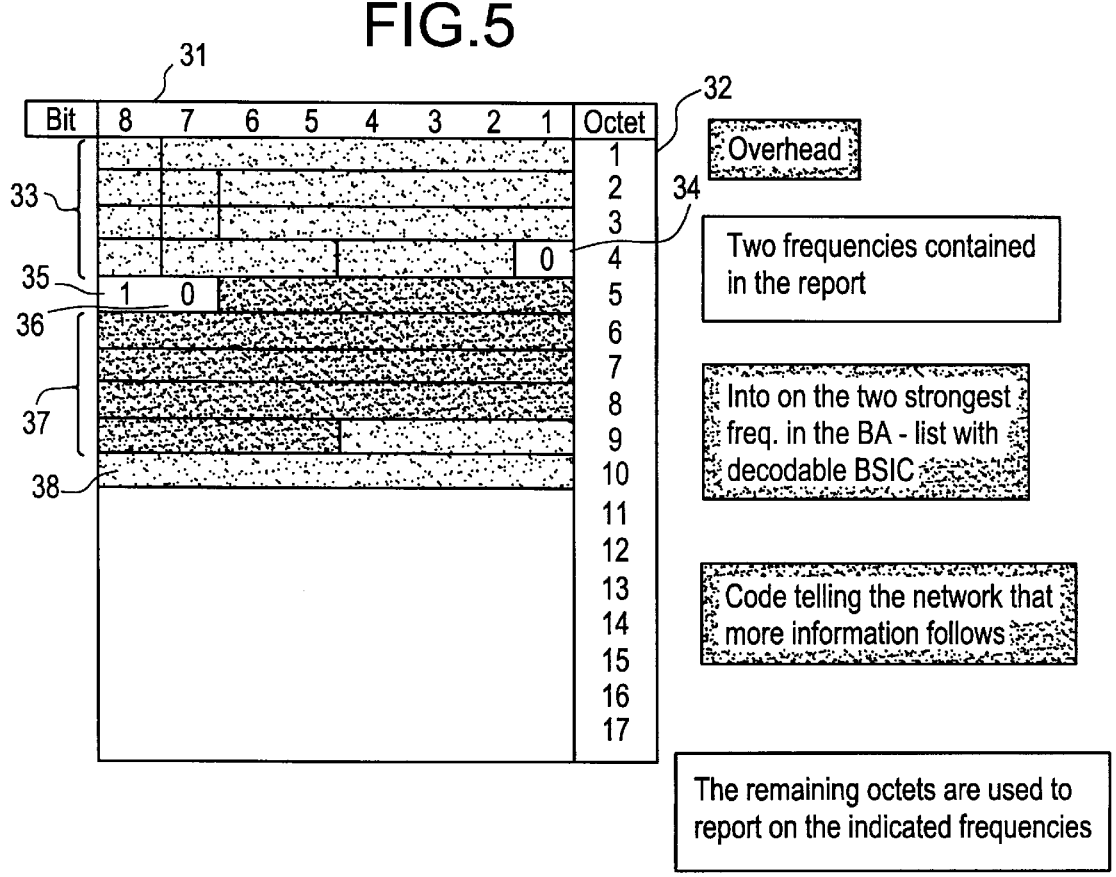
FIG. 5 is a pictorial diagram of an exemplary mobile station measurement report modified in accordance with the present invention by means of which a mobile station can report measurement and other data to the network.

In one example, the measurement report sent by the mobile station to the base station on the SACCH in accordance with the procedures of the present invention includes one formatted as shown in FIG. 5. In the measurement report of FIG. 5 the bit positions of each octet of data are shown on the horizontal axis 31 while octets 1–17 comprising the measurement report are shown along the vertical axis 32. The first few fields of the measurement report 33, shown in light grey shading, comprise overhead information in the message along with some information on the serving cell with respect to which the measurement report is being submitted. Immediately following this overhead field 33 are three bit positions 34, 35 and 36 indicating, for example, how many signal strength measurement reports on BCCH carriers with decodable BSICs are contained in the following octets of the report. The next field 37, covered with dark grey shading, include bits which represent the information being reported: the RXLEV measured, which frequencies the measurement is associated with and the BSIC which was decoded on that frequency. Measurement information is given for each of the number of BCCH carrier frequencies indicated in bits 34, 35 and 36. For example, in FIG. 5 these fields comprise the bits "010" which indicate two BCCH carrier frequencies are being reported in the following octets. The next field 38 indicate to the network that additional information is to come in this particular report. This indication is followed by octets 11 to 17 which contain the messages, for example, bits indicating the RXLEV on the TCH frequencies which have been measured as well as the frequency numbers corresponding to each of those measurements.

As can be seen from the exemplary measurement report of FIG. 5, substantial flexibility for reporting information, including signal quality measurements on traffic channel frequencies, as well as other administrative data which the network desires to have reported to it by a mobile station, can be included. The exemplary measurement report of FIG. 5 also represents one in a sequence of reports which can be prepared and forwarded by a mobile station to the network as part of a regular and systematic measurement and reporting cycle.

As mentioned above, a principal application of the measurement reporting technique of the present invention is the gathering of co-channel interference measurements within a cellular system for automatic or adaptive frequency planning within that system, such as one constructed in compliance with the GSM specification. The basic idea behind AFA is that the system measures within each cell the uplink and downlink signal strength on all frequencies, or a subset of frequencies, which are available to the operator. The measured signal strength on each frequency is used to estimate the interference that would be generated if that frequency was to be used in that cell. If any of the non-allocated frequencies for a particular cell has a lower interference than that of an allocated frequency, a frequency switch is made by the network control system. The most interfered with of the allocated frequencies is replaced by a frequency measured within the cell by the mobile which has a significantly lower signal strength and, preferably, the lowest measured signal strength within the cell. This procedure is performed repeatedly until no further improvement can be obtained in the quality of signals within the cell.

The necessary information for AFA is obtained by the performance of uplink measurements by the base station and downlink measurements by the mobiles within each cell. The system of the present invention provides a suitable way for the mobiles to communicate the results of their measurements on BCCH-carrier frequencies even though the BSIC of that carrier was not decodable and on frequencies outside the BCCH carrier frequencies such as TCH. The invention also provides a way for the network to indicate to the mobile stations which of those BCCH and non-BCCH carrier frequencies it desires to have measured and reported upon. Every cell within the network, or for example within a subset of the system, has a specific measurement frequency list referred to as the active BA-list which is sent to each mobile within that cell on the system 5 information in the SACCH at call setup. Thereafter, the frequencies in that list may be updated by frequencies contained in the SACCH system 5 information which may, if necessary, periodically redefine the BCCH carrier frequencies on neighboring cells for the purposes of handover, plus the special frequencies on which measurement is desired, such as TCH carriers for the purposes of evaluating co-channel interference within the cell.

Other functional features of the system of the present invention relates to the detection of bad BCCH channel allocations within a cell. For example, by measuring downlink signal strength on a given BCCH carrier and listening for the corresponding BSIC, it is possible to detect a bad BCCH channel allocation. If the mobiles are unable to decode the BSIC and the measured signal strength of that signal is high, then the BCCH frequency is interfered with and may not be suitable for use as a possible neighboring BCCH channel for hand-off. Also, if the mobile station in the cell decodes a different BSIC than the one which is anticipated for the BCCH carrier with which it is supposed to be associated, it may indicate some problem with BSIC allocations. If a BCCH carrier is interfered with so that the mobile stations can not decode a BSIC it will not show up in the conventional active mode measurement report even if the signal strength is high because of the nature of discrimination in the mobile with respect to the reporting on BSIC carriers. Similarly, if the BSIC can be decoded but the signal strength is too weak for the mobile to include the measurement in the measurement report, wherein only the six strongest frequency channels with decodable BSIC are included, it will also not show up in the conventional active mode measurement report even though the BSIC is decodable. Thus, the system of the present invention provides a way for mobile stations to inform their networks about actual conditions within the cell so that the network will have a full picture of the frequency qualities even though they may not fit within the conventional preselected pattern of measurement and reporting established by the standard for hand-off purposes.

Another purpose for which the system of the present invention may be used in addition to the detection and correction of bad BCCH allocations sent to a mobile is that of the disqualification of a BCCH carrier as a suitable neighbor. If the signal strength of a BCCH carrier is recorded as being strong but the mobile stations are unable to decode the basic on that carrier, the corresponding cell is not suitable as neighbor for those mobile stations.

As can be seen from the above description, the system of the present invention may be used to improve network performance in a number of different ways. If an operator includes a number of mobile stations within its network that can perform the extra tasks implemented by the invention, for example, the measurement of downlink signal strength as described above for purposes of automatic frequency allocation, it enhances the value of that network. The costs of network operation can be significantly decreased due to the inclusion of the AFA feature and this assists the network operator in gaining a competitive cost edge over competing systems. More particularly, an operator can avoid many of the expenses associated with periodic frequency planning after the network is initially put into operation.

If mobile stations which are capable of performing the enhanced measurement and reporting functionality described above in connection with the system of the present invention, are used in a cellular network which is not capable of such functionality, no new problems are introduced. That is, since the SACCH messages sent in the system 5 information in accordance with the present invention are wholly compatible with those under the existing standards, for example the GSM specification, the enhanced mobile station will continue to operate just as any other mobile station in the existing networks. When it sends a measurement report, the unenhanced network will read the field which indicates additional information is included in the report (bit 1 of octet 4 and bits 8 and 7 of octet 5 identified by characters 34, 35 and 36 in FIG. 5). Since the unenhanced network does not expect any more information it simply ignores these bits. An enhanced mobile operating in an unenhanced network would never measure any frequencies other than the indicated BCCH carrier frequencies contained in the BA-list because the unenhanced network would never send the same frequency twice in a BA-list and thereby indicate to the mobile station that it is to measure on anything other than the established BCCH frequencies.

In the event that an unenhanced mobile station is used within an enhanced network, the operation will be similarly compatible. Such unenhanced mobile stations would never attempt to send any additional information in the measurement report and thus the code occupying bit positions 34, 35 and 36 would not be there to indicate that there is additional information in the remaining octets of the report. The only consequence might be that these unenhanced mobile stations would make two attempts to measure and decode the BSIC on the BCCH frequency channels due to the fact that they might occur twice in the BA-list.

From the above description it can be seen that the system of the present invention can be used to transfer any information from a mobile station to a network and not simply transfer signal strength measurements on a defined set of frequencies. The invention provides a way for a system to seek and obtain information from its mobile station without increasing the air interface load and will operate compatibly with the existing air interface specification.

Figure 6:
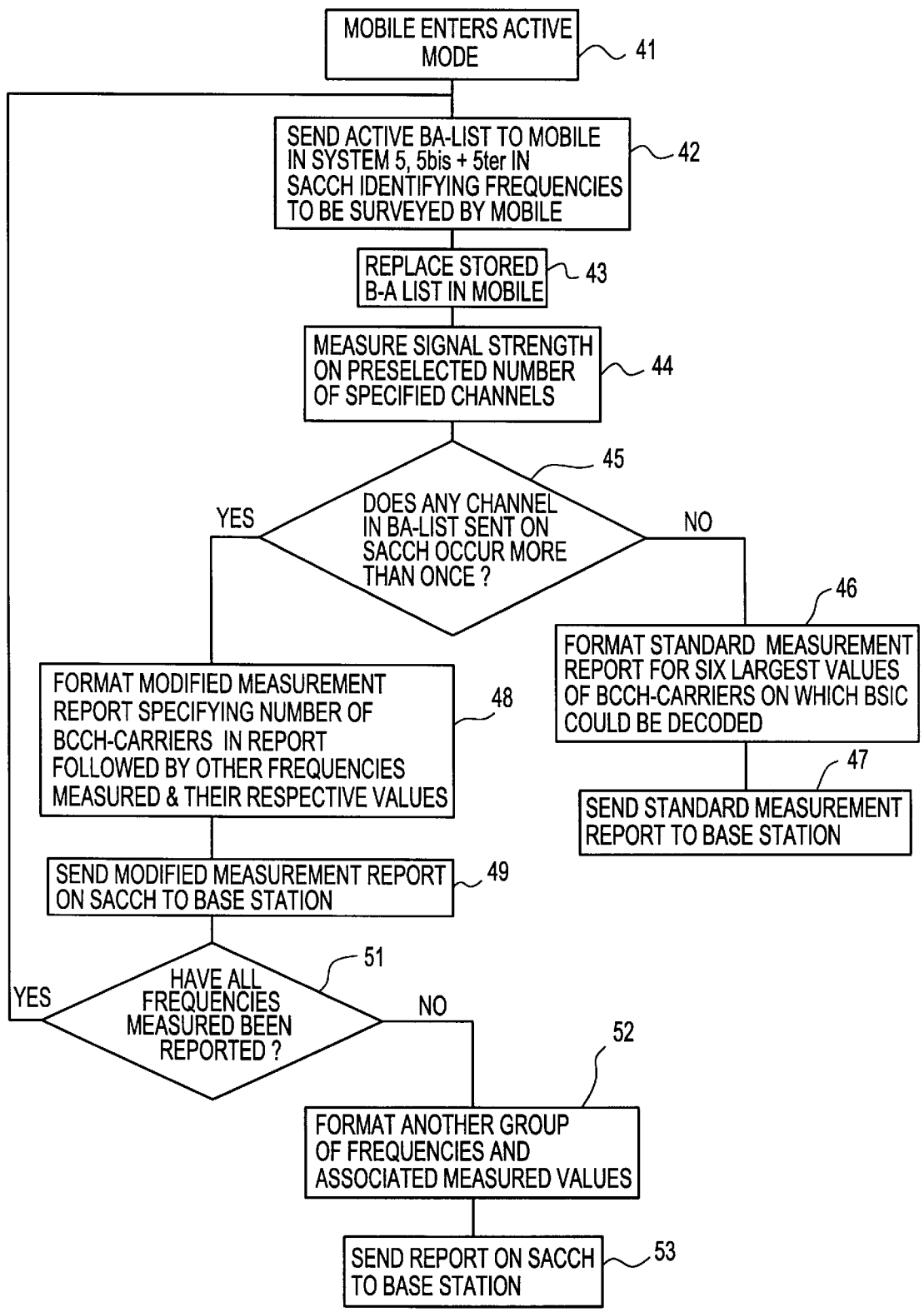
FIG. 6 is a flow chart illustrating one aspect of the method of the present invention.

Referring briefly to FIG. 6, there is shown a flow chart depicting steps in one aspect of a method employed in the present invention. At 41 a mobile station operating in accordance with the system of the present invention, enters the active mode, i.e., a call is setup. At 42 the BA-list is sent on the SACCH in the form of system 5, system $5_{bis}$ and system $5_{ter}$ message blocks supplemental information identifying both BCCH frequencies and TCH frequencies to be surveyed by the mobile in accordance with the present invention. The TCH channels and the BCCH channels which are to be reported regardless of whether the BSIC can be decoded are identified twice in the sequence of system 5, $5_{bis}$ and $5_{ter}$ message blocks on the SACCH. At 43 the mobile replaces the idle BA-list stored in its memory with the active BA-list sent via SACCH. If no special frequencies were included in the initial BA-list it is possible, at a later stage during the call, to replace that list at 42 with an updated list that contains the special frequencies. At 44 the mobile measures the signal strength of a preselected number of the channels as instructed by the network. At 45 the mobile determines whether any frequency channel that has been designated in the BA-list has been sent more than once. If not, the mobile moves to 46 at which it formats a standard message report and sends the measured signal values and channel designations on the six BCH carrier frequencies upon which was able to decode BSIC and which had the largest signal strengths. At 47 a standard format measurement report is sent to the base station.

If, however, at 45 the mobile determines that certain of the frequency channels designated in the BA-list occur more than once, it moves to 48 at which a modified measurement report is formatted and includes a field specifying the number of BCCH carriers be contained within that report followed by the channel designations of those BCCH carriers, the decoded BSICs of those carriers and the signal strengths thereof. In the remaining octets of the modified measurement report the channel designations and signal strength of additional frequency channels upon which measurements were instructed to be made by the double inclusion of the channel designations in the system 5 information. These might be TCH carriers or BCCH carriers upon which a report is desired regardless of the BSIC. At 49 the modified measurement report is sent by the mobile station to the base station on the SACCH. At 51 the mobile determines whether or not all frequencies as to which it has been instructed on the system 5 message to perform measurement reports have been formatted and sent to the base station. If so, the mobile has completed its cycle of measurements and reports and returns to 42 to possibly receive additional information from the base station and move to 44 to begin another cycle of measurements. If, however, all frequency measurements have not yet been reported, the mobile moves to 52 at which it formats an additional group of frequencies in accordance with the modified measurement report format along with their associated measured values and at 53, sends that additional report to the base station. If at 51 it is determined that all frequencies still have not reported the cycle of 51, 52 and 53 is repeated until all frequencies have been reported on and system returns to 42.

It should be understood that the specific cycle shown in FIG. 5 is exemplary and other formats of detailed instruction and reporting of information by the mobile station to the base may be performed in accordance with the present invention.

Figure 7:
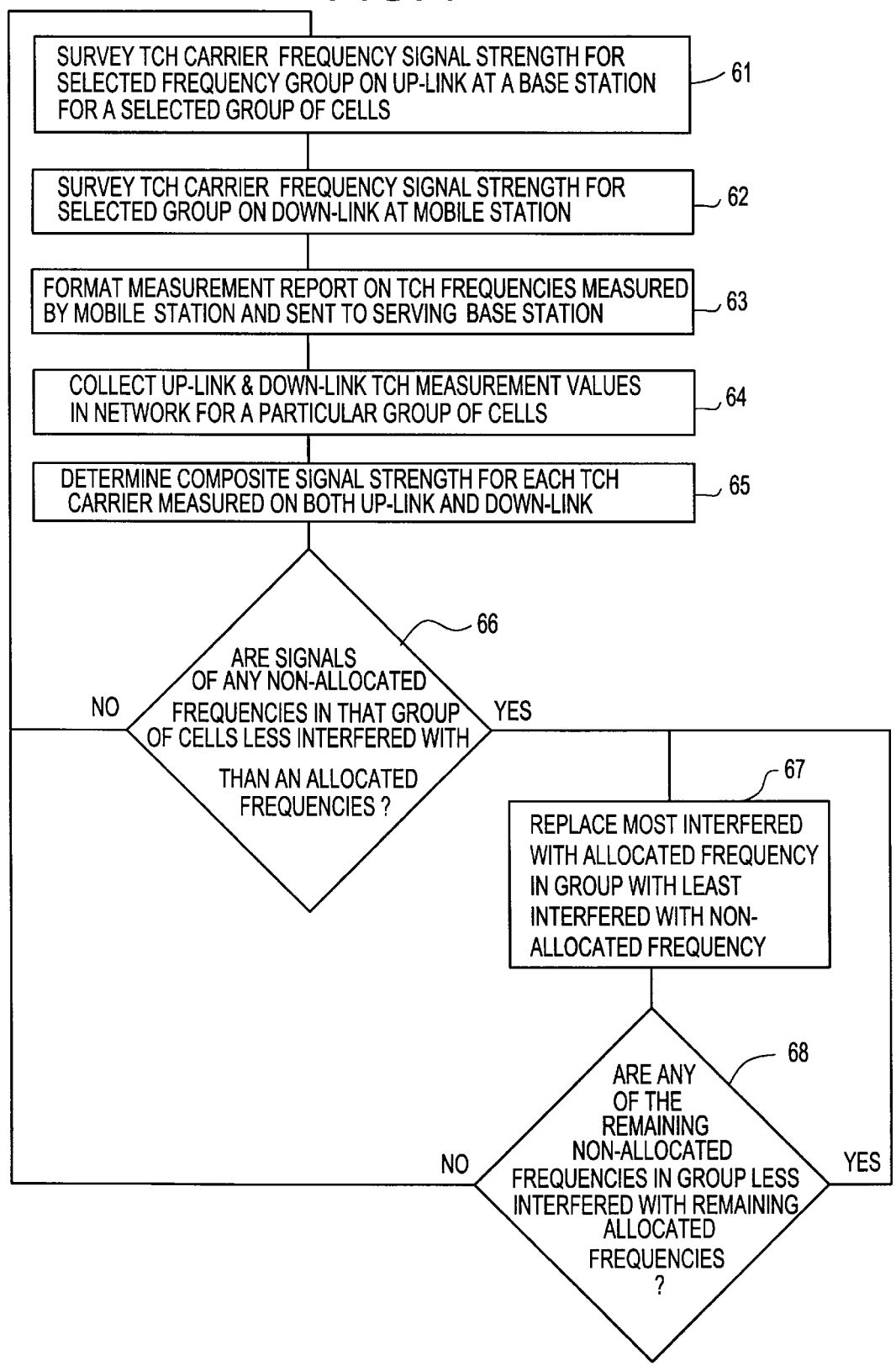
FIG. 7 is a flow chart illustrating another aspect of the method of the present invention.

Referring to FIG. 7, there is shown a flow chart of an exemplary process by which a cellular system might perform automatic frequency allocation in accordance with the system of the present invention. At 61, the system surveys TCH carrier frequency signal strengths of the channels within a selected frequency group on the uplink at the base station for a selected cell cluster within the system. At 62, the system surveys the TCH carrier frequency signal strengths for the channels of the same selected frequency group on the downlink as measured at mobile stations operating within the cells as described above. At 63 each mobile station formats a measurement report on the TCH frequencies measured by that mobile station and sends the report on those frequencies to the base station via the SACCH. At 64 the network collects both the uplink and downlink TCH measurement values for a particular cell or cell cluster and moves to 65 at which the network determines a composite signal strength for each of the TCH frequencies measured on both the uplink and downlink. For example, the network might choose the largest of the measured signal strength value between those measured on the uplink and those measured on the downlink as the composite for each TCH carrier. At 66, the network determines whether or not there are any non-allocated frequencies in that cell or cluster which are less interfered with than an allocated frequency. If not, the system returns to 61 to continue to survey signals on either the same cell or cluster or a different cell or cluster.

If, however, at 66 it is determined that there are signals of non-allocated frequencies which are less interfered with than those which are allocated by the current frequency plan, the system moves to 67 at which replaces the most interfered with frequency in that cell or cell cluster with a non-interfered with frequency not previously allocated. The system then moves to 68 at which it evaluates whether there are any remaining non-allocated frequencies in that cell or cluster which are less interfered with than a remaining currently allocated frequency. If not, the system returns to 61 and if so, continues to replace the most not yet replaced interfered with frequency in the cell or cluster with the most non-interfered with frequency. This cycle is continued until no further improvement can be had in that particular cell or cell cluster.

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. A method for obtaining information on non-BCCH carrier frequency channels within a particular cell of a cellular radio telecommunications network operating in accordance with an air interface standard which includes a broadcast control channel (BCCH) carrying control messages from a base station to mobiles stations operating with the cell which said base station is serving and a slow associated control channel (SACCH) carrying messages in both directions between each of said mobile stations and said base station while said mobile station is in active mode within said cell, said method comprising:

sending within a SACCH message from the base station serving said particular cell to said mobile station operating in active mode within that cell, a list of the non-BCCH carrier frequency channels upon which measurements are to be performed by the mobile station;

measuring at the mobile station the signal strength of each of the non-BCCH carrier frequencies specified in the SACCH message; and formatting a measurement report containing an identification of the particular non-BCCH carrier frequency channels measured by the mobile station along with the measurement results and sending said measurement report to the base station serving that cell within a SACCH message.

2. A method for obtaining information on non-BCCH carrier frequency channels within a particular cell of a cellular radio telecommunications network as set forth in claim 1 wherein:

said particular non-BCCH carrier frequencies on which signal strength measurements are to be made are identified to the mobile station by being included twice in said list of carrier frequency channels sent on the SACCH to be measured by the mobile station.

3. A method for obtaining information on non-BCCH carrier frequency channels within a particular cell of a cellular radio telecommunications network as set forth in claim 1 wherein:

said measurement report sent by the mobile station to the base station is of a standard length containing a fixed number of octets of data and includes a first data field containing indicia which indicate the number of BCCH-carriers on which measurement reports are included and thereby indicate that the remaining octets of that report contain the channel designations and signal strength measurements of the non-BCCH carriers measured by the mobile station.

4. A method for obtaining information on non-BCCH carrier frequency channels within a particular cell of a cellular radio telecommunications network as set forth in claim 1 wherein:

said measurement report sent by the mobile station to the base station is of a standard length containing a fixed number of octets of data and includes a second data field containing indicia which indicates that because the measurements ordered to be made and reported based upon the list sent from the base station to the mobile station are sufficient in number that they cannot all be contained in this measurement report, there is another measurement report to follow containing additional information from this cycle of measurement by the mobile station.

5. A method for obtaining information on non-BCCH carrier frequency channels within a particular cell of a cellular radio telecommunications network as set forth in claim 1 wherein the information sent from the base station to the mobile station includes a list of both BCCH-carrier frequency channels and non-BCCH carrier frequency channels upon which measurements are to be made by the mobile station and wherein said list is sent on the SACCH in the form of system 5, system $5_{bis}$ and $5_{ter}$ message blocks.

6. A method for obtaining information on non-BCCH carrier frequency channels within a particular cell of a cellular radio telecommunications network as set forth in claim 1 wherein the list sent to the mobile station by the base station on the SACCH indicates that no BCCH-carriers are to be included in the measurement report to be sent by the mobile station.

7. A data format for a frequency channel measurement report to be sent from a mobile station operating within a cell of a cellular system to a base station currently serving that mobile station within that cell wherein the body of said measurement report includes a fixed number of octets of data and may contain measurement reports on one or more broadcast control channel (BCCH) frequencies of other cells which are neighbors to said cell and wherein said data format of said measurement report comprises:

an overhead section within which information related to the mobile station sending the report and the cell within which it is operating is included;

a first identification section containing a multi-bit code which identifies the number of BCCH frequency channels upon which measurements are being reported in said report;

a BCCH-channel measurement section containing the measurement reports on said identified number of BCCH frequency channels along with their associated channel designations;

a second identification section containing an indication that additional information is to follow in the remaining octets of said report;

a non-BCCH channel measurement section containing additional information to be sent from the mobile station to the base station which fills substantially all of the remaining octets in said report.

8. A data format for a frequency channel measurement report to be sent from a mobile station operating within a cell of a cellular system to the base station currently serving that mobile station within that cell as set forth in claim 7 wherein:

said non-BCCH channel measurement section contains measurement reports on traffic channels (TCH) measured within said cell by said mobile station along with their associated channel designations.

9. A data format for a frequency channel measurement report to be sent from a mobile station operating within a cell of a cellular system to the base station currently serving that mobile station within that cell as set forth in claim 7 wherein:

said first identification section contains the multi-bit code which indicates that no BCCH frequency channel measurements are being reported in said report; and said BCCH-channel measurement section is substantially filled with TCH frequency channel measurements along with their associated channel designations.

10. A data format for a frequency channel measurement report to be sent from a mobile station operating within a cell of a cellular system to the base station currently serving that mobile station within that cell as set forth in claim 7 wherein said measurement report also contains a field indicating that the report is part of a sequence of reports in a single cycle of measurements.

11. A method for obtaining information on radio frequency channels within a particular cell of a cellular radio telecommunications network operating in accordance with an air interface standard which includes a broadcast control channel (BCCH) carrying control messages from a base station to mobiles stations operating with the cell which said base station is serving and a slow associated control channel (SACCH) carrying messages in both directions between each of said mobile stations and said base station while said mobile station is in active mode within said cell, said air interface standard providing for periodic measurement of the signal strength of the BCCH-carriers of the neighboring cells of said particular cell for purposes of possible handoff of said mobile station to a neighboring cell by sending a list of said neighboring BCCH-carriers to each mobile station in said particular cell within a message sent on the SACCH, said method comprising:

sending within said SACCH message containing said list of neighboring BCCH-carriers from the base station serving said particular cell to said mobile station operating in active mode within that cell, a list of non-BCCH carrier frequency channels upon which measurements are to be performed by the mobile station;

measuring at the mobile station the signal strength of each of the BCCH-carrier and non-BCCH carrier frequencies specified in the SACCH message; and formatting a measurement report containing an identification of both the BCCH-carriers and the non-BCCH carrier frequency channels measured by the mobile station along with the measurement results; and sending said measurement report from the mobile station to the base station serving that cell within a SACCH message.

12. A method for obtaining information on radio frequency channels within a particular cell of a cellular radio telecommunications network as set forth in claim 11 wherein:

said particular non-BCCH carrier frequencies on which signal strength measurements are to be made are identified to the mobile station by being included twice in said list of carrier frequency channels sent on the SACCH to be measured by the mobile station.

13. A method for obtaining information on radio carrier frequency channels within a particular cell of a cellular radio telecommunications network as set forth in claim 11 wherein:

said measurement report sent by the mobile station to the base station is of a standard length containing a fixed number of octets of data and includes a first identification data field containing indicia which indicate the number of BCCH-carriers on which measurement reports are included and thereby indicates that the remaining octets of that report contain the channel designations and signal strength measurements of the non-BCCH carriers measured by the mobile station.

14. A method for obtaining information radio frequency channels within a particular cell of a cellular radio telecommunications network as set forth in claim 11 wherein:

said measurement report sent by the mobile station to the base station is of a standard length containing a fixed number of octets of data and includes a second identification data field containing indicia which indicates that because the measurements ordered to be made and reported based upon the list sent from the base station to the mobile station are sufficient in number that they cannot all be contained in this measurement report, that there is another measurement report to follow containing additional information from this cycle of measurement by the mobile station.

15. A method for obtaining information on radio frequency channels within a particular cell of a cellular radio telecommunications network as set forth in claim 11 wherein said air interface standard provides for system 5 information to be sent within SACCH messages from said serving base station to mobile stations within said particular cell and wherein said list of frequency channels on which information is to be measured is sent in the form of system 5, system $5_{bis}$ and system $5_{ter}$ message blocks.

16. A method for obtaining information on radio frequency channels within a particular cell of a cellular radio telecommunications network as set forth in claim 11 wherein the list sent to the mobile station by the base station on the SACCH indicates that no BCCH-carriers are to be included in the measurement report to be sent by the mobile station.

17. A method of performing automatic frequency allocation within a cellular radio telecommunications system operated in accordance with an air interface standard which includes a broadcast control channel (BCCH) carrying control messages from a base station to mobile stations operating with the cell which said base station is serving and a slow associated control channel (SACCH) carrying messages in both directions between each of said mobile stations and said base station while said mobile station is in active mode within said cell, said method comprising the steps of:

measuring on the uplink at the base station the signal strength on a plurality of carrier frequencies within a plurality of the cells of said system;

measuring on the downlink at at least one mobile station within each of said plurality of cells the signal strength on a plurality of carrier frequencies, said step of measuring on the downlink further including the steps of:

sending within a SACCH message from the base station serving each of said cells to a mobile station operating in active mode within that cell, a list of the non-BCCH carrier frequency channels upon which measurements are to be performed by the mobile station;

measuring at the mobile station the signal strength of each of the non-BCCH carrier frequencies specified in the SACCH message; and formatting a measurement report containing an identification of the particular non-BCCH carrier frequency channels measured by the mobile station along with the measurement results;

sending the measured signal strengths of the carrier frequencies measured at each mobile station to their respective serving base stations in the form of the measurement report using a SACCH message;

assembling within the system a composite signal strength value for each of the carriers which is currently allocated within a selected one of said plurality of cells by the system frequency plan and a composite signal strength value for each of the carriers which is not allocated within said same selected one of said plurality of cells by the system frequency plan;

determining whether any non-allocated frequencies within said cell are less interfered with than any allocated frequencies in said cell;

modifying said system frequency plan by replacing a more interfered with frequency in said cell with a less interfered with frequency to improve the quality of service within said cell.

18. A method of performing automatic frequency allocation within a cellular radio telecommunications system as set forth in claim 17 wherein said step of modifying said system frequency plan by replacing a more interfered with frequency in said cell with a less interfered with frequency to improve the quality of service within said cell includes iteratively replacing the most interfered with frequency in said with the least interfered with frequency until no further improvement in quality of service can be obtained within each cell.

19. A method of performing automatic frequency allocation within a cellular radio telecommunications system as set forth in claim 17 wherein within said step of measuring on the downlink at at least one mobile station within each of said plurality of cells the signal strength on a plurality of carrier frequencies, and wherein:

said particular non-BCCH carrier frequencies on which signal strength measurements are to be made are identified to each mobile station by being included twice in said list of carrier frequency channels sent on the SACCH to be measured by each mobile.

20. A system for obtaining information on non-BCCH carrier frequency channels within a particular cell of a cellular radio telecommunications network operating in accordance with an air interface standard which includes a broadcast control channel (BCCH) carrying control messages from a base station to mobiles stations operating with the cell which said base station is serving and a slow associated control channel (SACCH) carrying messages in both directions between each of said mobile stations and said base station while said mobile station is in active mode within said cell, said system comprising:

means for sending within a SACCH message from the base station serving said particular cell to said mobile station operating in active mode within that cell, a list of the non-BCCH carrier frequency channels upon which measurements are to be performed by the mobile station;

means for measuring at the mobile station the signal strength of each of the non-BCCH carrier frequencies specified in the SACCH message; and means for formatting a measurement report containing an identification of the particular non-BCCH carrier frequency channels measured by the mobile station along with the measurement results; and means for sending said report to the serving base station of that cell within a SACCH message.

21. A system for obtaining information on non-BCCH carrier frequency channels within a particular cell of a cellular radio telecommunications network as set forth in claim 20 wherein:

said particular non-BCCH carrier frequencies on which signal strength measurements are to be made are identified to the mobile station by being included twice in said list of carrier frequency channels sent on the SACCH to be measured by the mobile station.

22. A system for obtaining information on non-BCCH carrier frequency channels within a particular cell of a cellular radio telecommunications network as set forth in claim 20 wherein:

said measurement report sent by the mobile station to the base station is of a standard length containing a fixed number of octets of data and includes a first identification data field containing indicia which indicate the number of BCCH-carriers on which measurement reports are included and thereby indicate that the remaining octets of that report contain the channel designations and signal strength measurements of the non-BCCH carriers measured by the mobile station.

23. A system for obtaining information on non-BCCH carrier frequency channels within a particular cell of a cellular radio telecommunications network as set forth in claim 20 wherein:

said measurement report sent by the mobile station to the base station is of a standard length containing a fixed number of octets of data and includes a second identification data field containing indicia which indicates that because the measurements ordered to be made and reported in based upon the list sent from the base station to the mobile station are sufficient number that they cannot all be contained in this measurement report, that there is another measurement report to follow containing additional information from this cycle of measurement by the mobile station.

24. A system for obtaining information on non-BCCH carrier frequency channels within a particular cell of a cellular radio telecommunications network as set forth in claim 20 wherein the information sent from the base station to the mobile station includes a list of both BCCH-carrier frequency channels and non-BCCH carrier frequency channels upon which measurements are to be made by the mobile station and wherein said list is sent on the SACCH in the form of system 5, system 5$_{bis}$ and system 5$_{ter}$ message blocks.

25. A system for obtaining information on non-BCCH carrier frequency channels within a particular cell of a cellular radio telecommunications network as set forth in claim 20 wherein the list sent to the mobile station by the base station on the SACCH indicates that no BCCH-carriers are to be included in the measurement report to be sent by the mobile station.

26. A system for obtaining information on radio frequency channels within a particular cell of a cellular radio telecommunications network operating in accordance with an air interface standard which includes a broadcast control channel (BCCH) carrying control messages from a base station to mobiles stations operating with the cell which said base station is serving and a slow associated control channel (SCCH) carrying messages in both directions between each of said mobile stations and said base station while said mobile station is in active mode within said cell, said air interface standard providing for periodic measurement of the signal strength of the BCCH-carriers of the neighboring cells of said particular cell for purposes of possible handoff of said mobile station to a neighboring cell by sending a list of said neighboring BCCH-carriers to each mobile station in said particular cell within a message sent on the SACCH, said system comprising:

means for sending within said SACCH message containing said list of neighboring BCCH-carriers from the base station serving said particular cell to said mobile station operating in active mode within that cell, a list of non-BCCH carrier frequency channels upon which measurements are to be performed by the mobile station;

means for measuring at the mobile station the signal strength of each of the BCCH-carriers and non-BCCH carrier frequencies specified in the SACCH message; and means for formatting a measurement report containing an identification of both the BCCH-carriers and the non-BCCH carrier frequency channels measured by the mobile station along with the measurement results; and means for sending said measurement report to the base station serving that cell within a SACCH message.

27. A system for obtaining information on radio frequency channels within a particular cell of a cellular radio telecommunications network as set forth in claim 26 wherein:

said particular non-BCCH carrier frequencies on which signal strength measurements are to be made are identified to the mobile station by being included twice in said list of carrier frequency channels sent on the SACCH to be measured by the mobile station.

28. A system for obtaining information on radio carrier frequency channels within a particular cell of a cellular radio telecommunications network as set forth in claim 26 wherein:

said measurement report sent by the mobile station to the base station is of a standard length containing a fixed number of octets of data and includes a first information data field containing indicia which indicate the number of BCCH-carriers on which measurement reports are included and thereby indicates that the remaining octets of that report contain the channel designations and signal strength measurements of the non-BCCH carriers measured by the mobile station.

29. A system for obtaining information radio frequency channels within a particular cell of a cellular radio telecommunications network as set forth in claim 26 wherein:

said measurement report sent by the mobile station to the base station is of a standard length containing a fixed number of octets of data and includes a second information data field containing indicia which indicates that because the measurements ordered to be made and reported in based upon the list sent from the base station to the mobile station are sufficient in number that they cannot all be contained in this measurement report, that there is another measurement report to follow containing additional information from this cycle of measurement by the mobile station.

30. A system for obtaining information on radio frequency channels within a particular cell of a cellular radio telecommunications network as set forth in claim 26 wherein said air interface standard provides for system 5 information to be sent within SACCH messages from said serving base station to mobile stations within said particular cell and wherein said list of frequency channels on which information is to be measured is sent in the form of system 5, system $5_{bis}$ and system $5_{ter}$ message blocks.

31. A system for obtaining information on radio frequency channels within a particular cell of a cellular radio telecommunications network as set forth in claim 26 wherein the list sent to the mobile station by the base station on the SACCH indicates that no BCCH-carriers are to be included in the measurement report to be sent by the mobile station.

32. A system for performing automatic frequency allocation within a cellular radio telecommunications system operated in accordance with an air interface standard which includes a broadcast control channel (BCCH) carrying control messages from a base station to mobile stations operating with the cell which said base station is serving and a slow associated control channel (SACCH) carrying messages in both directions between each of said mobile stations and said base station while said mobile station is in active mode within said cell, said system comprising:

means for measuring on the uplink at the base station the signal strength on a plurality of carrier frequencies within a plurality of the cells of said system;

means for measuring on the downlink at at least one mobile station within each of said plurality of cells the signal strength on a plurality of carrier frequencies, said means for measuring on the downlink further including:

means for sending within a SACCH message from the base station serving each of said cells to a mobile station operating in active mode within that cell, a list of the non-BCCH carrier frequency channels upon which measurements are to be performed by the mobile station;

means for measuring at the mobile station the signal strength of each of the non-BCCH carrier frequencies specified in the SACCH message; and means for formatting a measurement report containing an identification of the particular non-BCCH carrier frequency channels measured by the mobile station along with the measurement results;

means for sending the measured signal strengths of the carrier frequencies measured at the mobile stations to each of their respective serving base stations in the form of the measurement report;

means for assembling within the network a composite signal strength value for each of the carriers which is currently allocated within a selected one of said plurality of cells by the system frequency plan and a composite signal strength value for each of the carriers which is not allocated within said same selected one of said plurality of cells by the system frequency plan;

means for determining whether any non-allocated frequencies within said cell are less interfered with any allocated frequencies in said cell;

means for modifying said system frequency plan by replacing a more interfered with frequency in said cell with a less interfered with frequency to improve the quality of service within said cell.

33. A system for performing automatic frequency allocation within a cellular radio telecommunications system as set forth in claim 32 wherein said step of modifying said system frequency plan by replacing the most interfered with frequency in said cell with a less interfered with frequency to improve the quality of service within said cell includes iteratively replacing the most interfered with frequency with the least interfered with frequency repeated until no further improvement in quality of service can be obtained within each cell.

34. A system for performing automatic frequency allocation within a cellular radio telecommunications system as set forth in claim 32 wherein within said step of measuring on the downlink at at least one mobile station within each of said plurality of cells the signal strength on a plurality of carrier frequencies, said particular non-BCCH carrier frequencies on which signal strength measurements are to be made are identified to each mobile station by being included twice in said list of carrier frequency channels sent on the SACCH to be measured by each mobile.

* * * * *